United States Patent
Keehan

[15] 3,670,382
[45] June 20, 1972

[54] METHOD FOR PRODUCING A REINFORCED RESINOUS IMPELLER AND PRODUCT

[72] Inventor: Donald J. Keehan, 31012 Huntington Woods Parkway, Bay Village, Ohio 44140

[22] Filed: Jan. 5, 1970

[21] Appl. No.: 570

[52] U.S. Cl. ................... 29/156.8 CF, 416/223, 29/156.8 R
[51] Int. Cl. ................. B21k 3/04, B23p 15/02, B23p 15/04
[58] Field of Search ............... 29/156.8 R, 156.8 B, 156.8 H, 29/156.8 P, 156.8 I, 156.8 FC, 156.8 CF; 416/223

[56] References Cited

UNITED STATES PATENTS

| | | | |
|---|---|---|---|
| 541,000 | 6/1895 | Morris | 29/156.8 R |
| 1,458,602 | 6/1923 | Upton | 29/156.8 CF |
| 2,310,841 | 2/1943 | Curtis | 29/156.8 CF |
| 2,654,943 | 10/1953 | Campbell | 29/156.8 CF |
| 2,910,224 | 10/1959 | Campbell | 29/156.8 CF |
| 3,159,106 | 12/1964 | Schumbacker | 29/156.8 CF |
| 3,225,422 | 12/1965 | Sebok | 29/156.8 CF |

Primary Examiner—John F. Campbell
Assistant Examiner—Donald P. Rooney
Attorney—Woodling, Krost, Granger and Rust

[57] ABSTRACT

A method of making an impeller which is particularly adapted for use in a centrifugal pump and which has generally spirally extending vanes which extend outwardly from a central portion which method comprises the steps of selecting an elongated reinforcing member and winding the reinforcing member along the path of a vane and extending it to the central portion and then along the path of another vane and back to the central portion and so on, until there is built up a reinforcing structure having vane reinforcing walls which extend in basically the same direction as the vanes. The next step in the process is to apply tension to the wound reinforcing member and in the embodiment illustrated herein, this tension is applied by rotating a hub to which each of the reinforcing walls is attached which causes the same to be tensioned. The elongated reinforcing member preferably has resin applied thereto prior to winding the same; however, the resin may be applied after it is wound. In either event, the wound resin-wetted reinforcing member is then cured while the tension is maintained on the individual reinforcing walls. The cured reinforcing structure is next placed into a mold having the shape of the finished impeller and the reinforcing walls of the reinforcing structure occupy positions in the mold which correspond to the vanes of the impeller. The next step is to introduce a curable resin into the mold which resin assumes the shape of and forms the finished impeller. The resin is next cured and the formed impeller is removed from the mold.

Also included as part of the disclosure herein is the winding mold for producing the reinforcing structure for the impeller. The winding mold comprises a plate which has a plurality of circumferentially spaced and generally radially extending form members secured thereto. These form members generally assume the contour of the finished impeller. A hub member is located generally centrally of the form members in a central opening in the plate and pins are positioned in the plate outwardly of the ends of the form members. The hub member in this embodiment is provided with a plurality of diametrically extending slots which are adapted to receive the elongated reinforcing member which is wound on the winding mold.

The finished product is an impeller which includes in combination a composite resinous mass molded into the impeller shape which shape has and includes a plurality of circumferentially spaced and generally radially extending vanes extending from a central hub portion. A composite reinforcing structure is imbedded in the resinous mass and includes a hub member imbedded at the central hub portion and vane reinforcing walls secured to the hub member and imbedded in the respective vanes. Each of the vane reinforcing walls comprises an elongated reinforcing member secured to the hub member and arranged in the shape of the vanes. Each of the vane reinforcing walls is wetted with resin at some stage of its construction which resin is cured while each of the vane reinforcing walls is maintained under tension.

5 Claims, 9 Drawing Figures

INVENTOR.
DONALD J. KEEHAN

INVENTOR.
DONALD J. KEEHAN

INVENTOR.
DONALD J. KEEHAN

INVENTOR.
DONALD J. KEEHAN

METHOD FOR PRODUCING A REINFORCED RESINOUS IMPELLER AND PRODUCT

The present invention will be discussed specifically with regard to the construction of the impeller for use in a centrifugal pump; however, it will be readily appreciated by those skilled in the art that the present invention is susceptible of being described not only in connection with the impeller of a centrifugal pump, but for like constructions which can be utilized in an analogous way.

In the prior art, referring specifically to the impellers for centrifugal pumps, the constructions primarily resorted to involved cast and/or machined impellers of metals. The disadvantages of such constructions are apparent primarily in the areas where they are subjected to the highly corrosive and errosive nature of many fluids encountered in the chemical industry. Other disadvantages which are apparent is that such metallic constructions do not have an extremely high tensile strength and they have a tendency to crack and otherwise deteriorate at high rotational speeds. Attempts have also been made to construct such items out of plastics, otherwise referred to as synthetic resins, by way of casting. Essentially the same disadvantages have resulted with the resin type constructions even though the resinous materials do have the advantage of high resistance to corrosion and errosion of many chemical fluids.

The present invention relates to taking advantage, in constructing pump impellers, of the high chemical resistance to corrosion and errosion of resinous materials, while still producing a structure by means of a properly oriented elongated reinforcing member, so as to produce a pump impeller which has strengths in excess of those previously obtained by metal constructions and not in any way heretofore realized.

Figure 8:
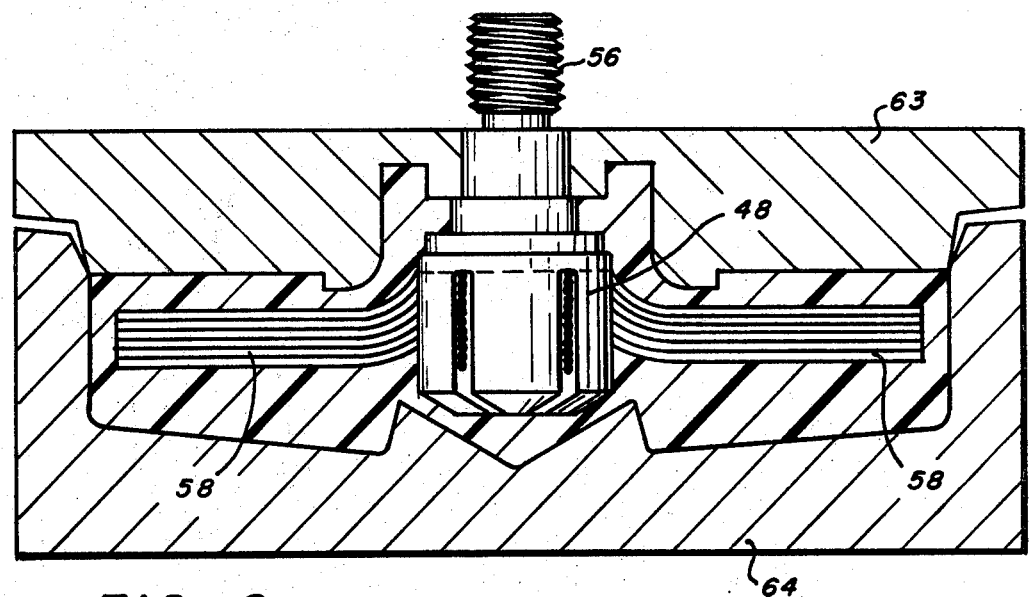
FIG. 8 shows the reinforcing structure of FIG. 4 placed in a mold which is to complete the finally molded composite resinous mass into the shape of a pump impeller.
Figure 9:
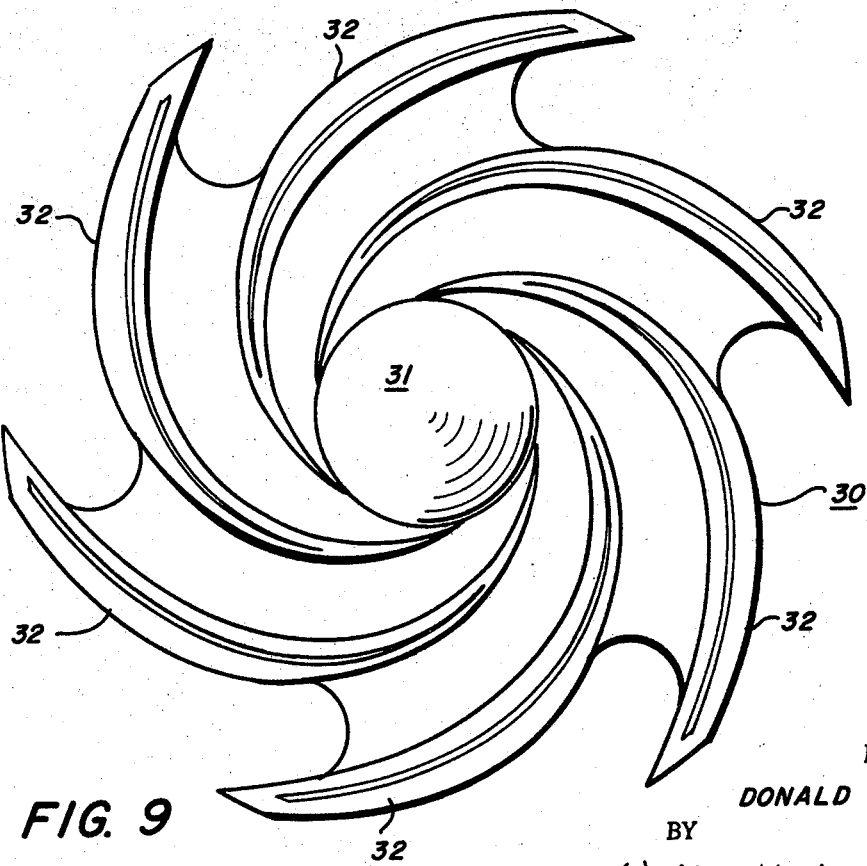
FIG. 9 is a plan view of the finally molded pump impeller taken in what might be referred to as a bottom plan view of FIG. 8 with the mold removed.

The impeller which is produced by the method and apparatus of the present invention is indicated by the reference numeral 30 and in plan view as best seen in FIG. 9. The shape of the impeller in cross section is best observed from the mold view of FIG. 8.

Figure 1:
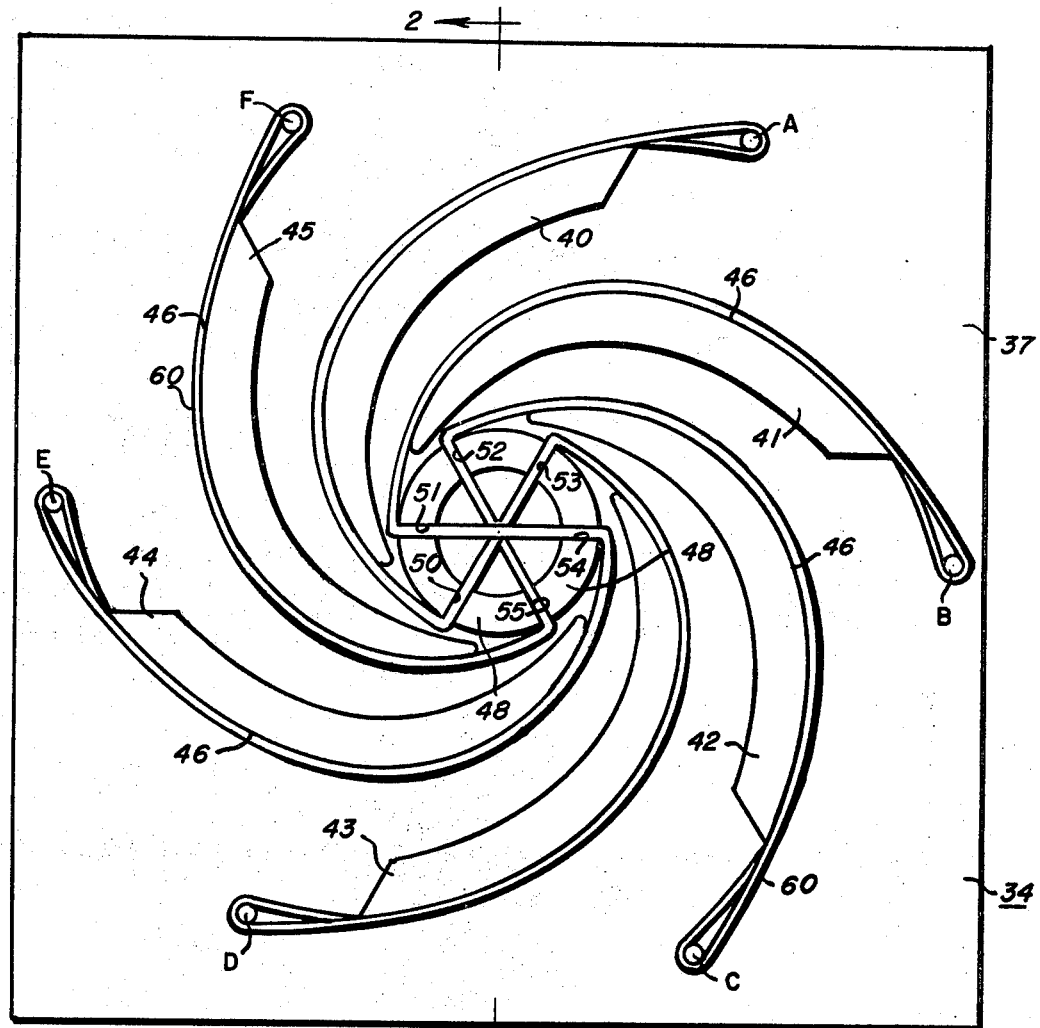
FIG. 1 is a plan view of the winding mold of the present invention.
Figure 2:
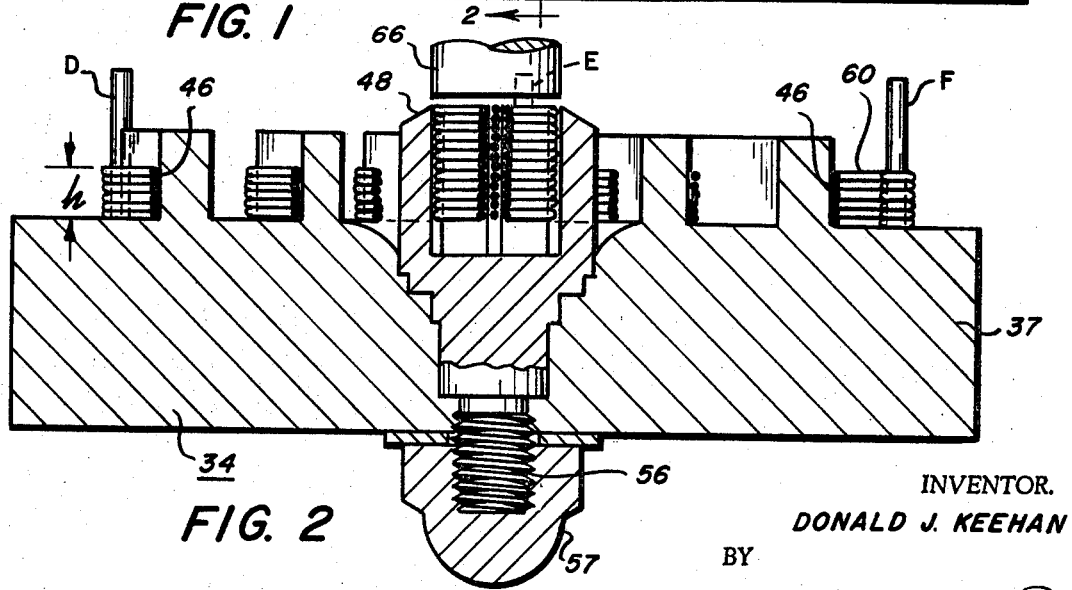
FIG. 2 is a view taken generally along the line 2—2 of FIG. 1.
Figure 3:
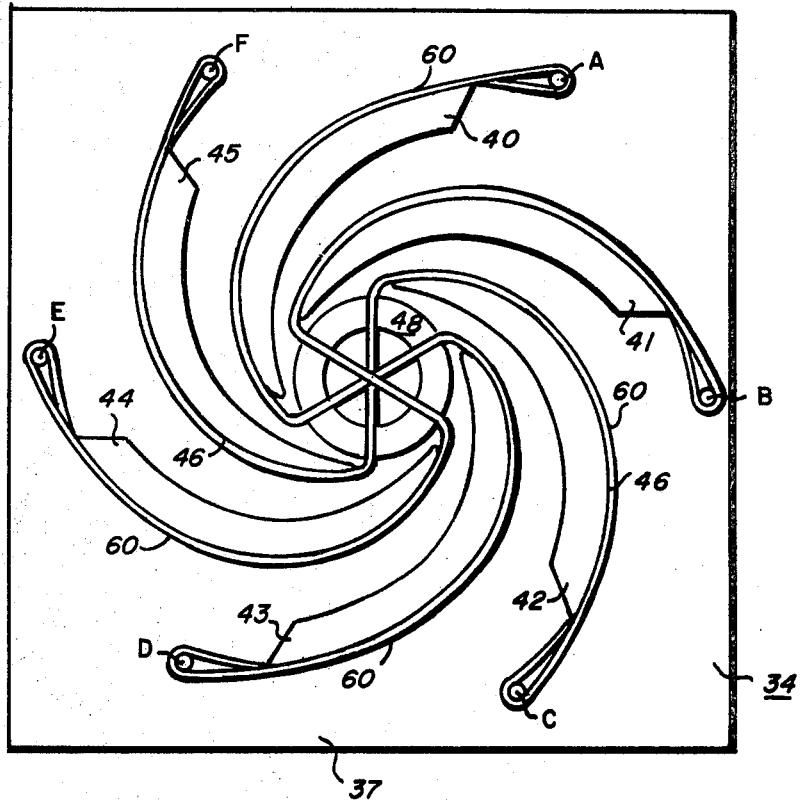
FIG. 3 is a smaller view of the structure shown in FIG. 1 and differing slightly from FIG. 1 in that in this view the hub member has not yet been rotated to tension the reinforcing walls.
Figure 4:
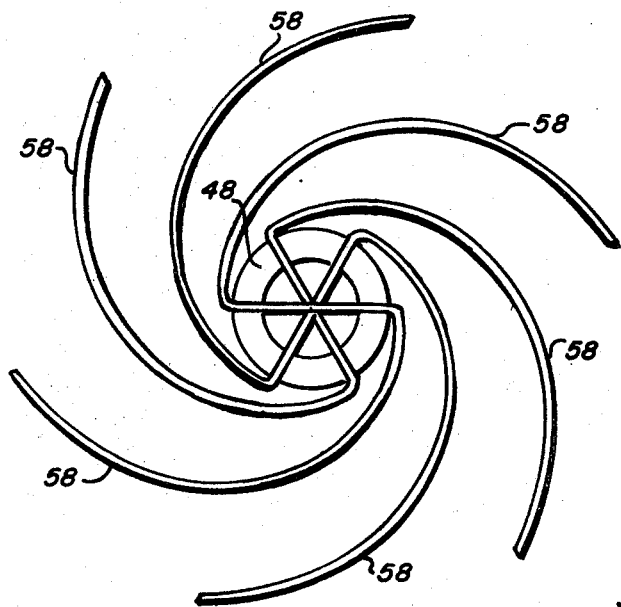
FIG. 4 is a view similar to FIG. 3 but showing the reinforcing structure after it has been cured and after the reinforcing walls have been cut or severed at the outer radial ends of the form members.

The impeller 30 also includes a central hub portion 31 as well as a plurality of vanes 32 which in this particular embodiment are six in number. The initial steps of the present invention are accomplished by utilizing a winding mold which is best seen in FIGS. 1, 2 and 3 and which is identified by the reference numeral 34. The winding mold 34 includes a plate upon which are secured six form members, numbered 40 through 45 and as will be seen particularly from FIG. 1, these form members are circumferentially spaced and extend generally radially from a central portion in a spiral path which conforms to the path of the vanes 32 in the finished impeller as seen in FIG. 9. As will be seen, each of the form members 40 through 45 are provided with a sidewall, all of which have been identified by the reference numeral 46, against which the reinforcing member which will be described hereinafter is positioned adjacent in order to assume the shape of the form members.

A hub member 48 is provided and extends through an opening in the plate 37 (FIG. 2). The end of the hub member which is positioned adjacent the upper surface of the plate is provided with a circular recess and the annular wall which remains is provided with radially extending slots 50 through 55 which are equidistantly spaced in an angular direction from each other and which are provided for a purpose which will be discussed more fully hereinafter. The opposite end of the hub member is provided with threads 56 which are adapted to cooperate with a cap nut 57 which serves to rotationally secure the hub member 48 in a desired angular position with respect to the plate 37. A plurality of pins identified by the letters A, B, C, D, E, and F, are provided on the upper surface of the plate 37 as indicated in FIG. 1. An elongated reinforcing member 60, which in the preferred embodiment is a fiberglass filament, is wound in a pattern upon the winding mold so as to produce a reinforcing structure which comprises six vane reinforcing walls all identified by the reference numeral 58. The general pattern which the wound elongated member 60 assumes is seen in the plan view of FIG. 1, and it will be noted from viewing FIG. 2 that a plurality of vane reinforcing walls 58 are provided which have a height which is determined by the number of times the pattern of FIG. 1 is reproduced. It will be seen specifically from FIG. 2 that six layers of the elongated reinforcing member 60 have been utilized to build up a height of material which is identified in FIG. 2 by the small letter h.

Figure 5:
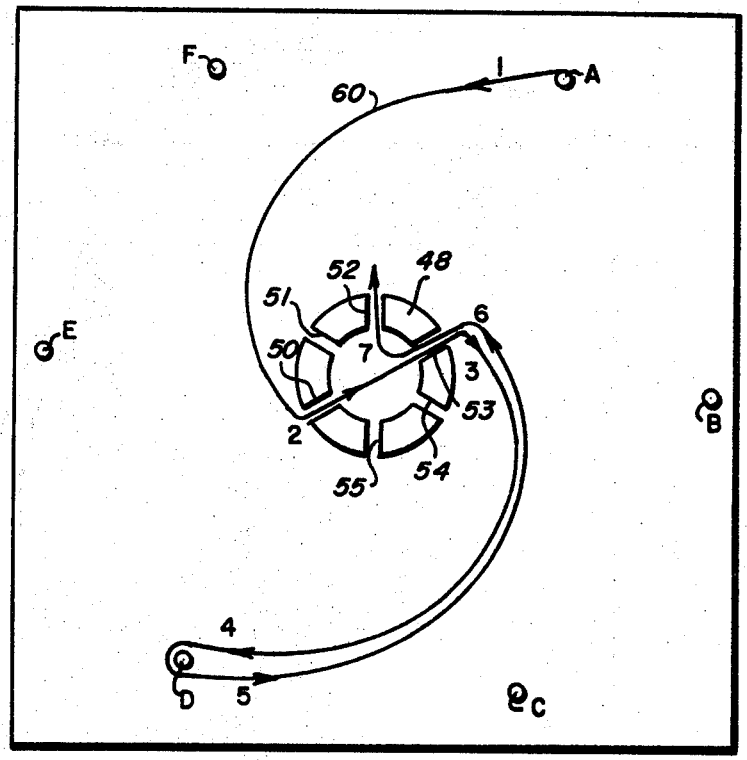
FIGS. 5, 6 and 7 show a preferred pattern of winding the elongated reinforcing member on the winding mold shown in FIGS. 1, 2 and 3.
Figure 6:
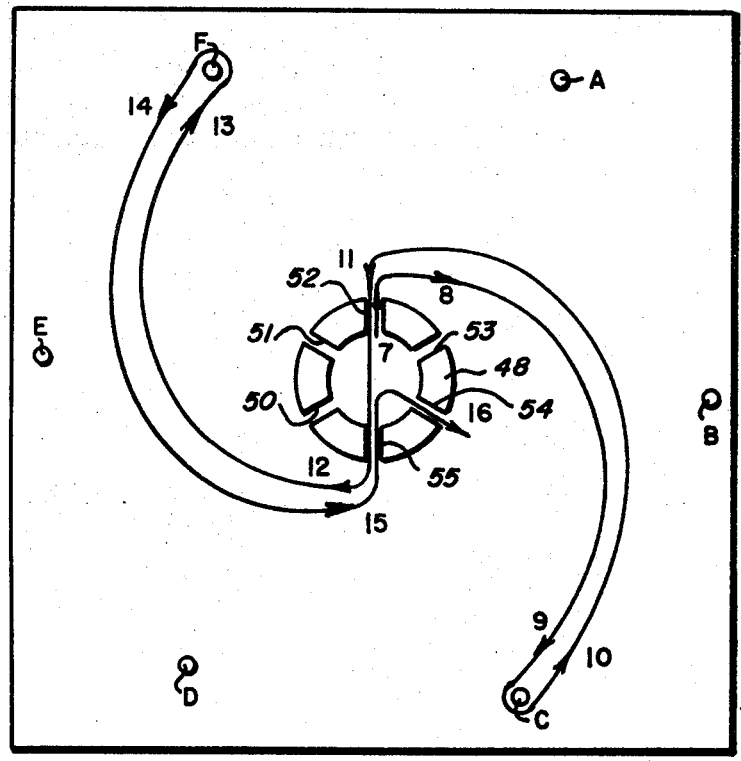
Figure 7:
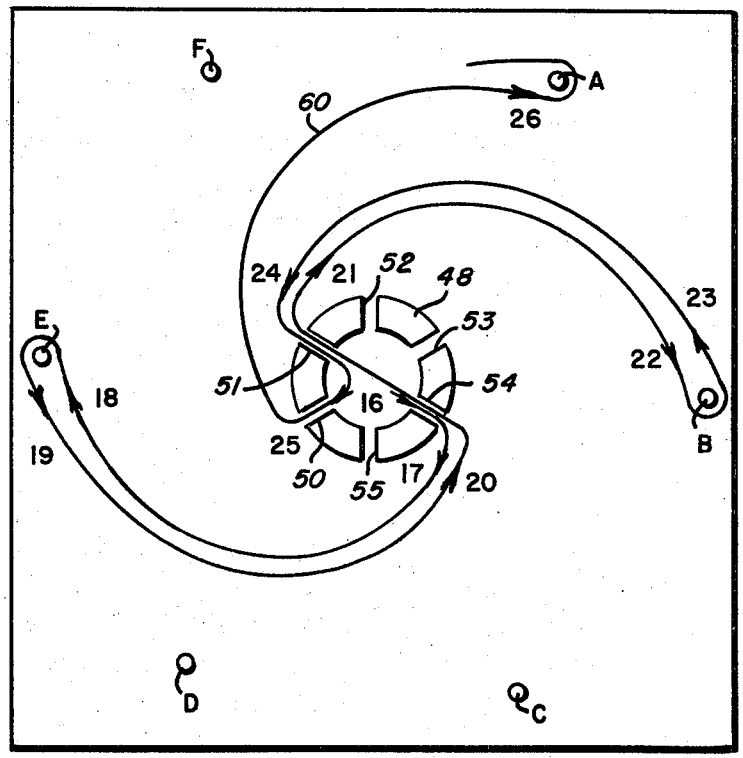

FIGS. 5, 6 and 7 are schematic views demonstrating the preferred path of winding the elongated reinforcing member 60 to produce the reinforcing structure which includes the six vane reinforcing walls 58. Referring specifically to FIG. 5, the elongated reinforcing member 60 is wound about pin A and is then brought down along form member 40 (not shown in this view) toward the hub member 48. The reinforcing member is then brought into the hub 48 through slot 50 and exits the hub 48 through slot 53 and next is brought down along the sidewall 46 of form member 43 (also not shown in this view), around pin D and back into slot 53 as shown. The direction of winding the elongated reinforcing member is best seen by following the arrows and the numerals in FIG. 5 which numerals are 1 through 7. Numeral 7 in FIG. 5 is the position with which the description of the winding pattern in FIG. 6 begins. It will be seen in FIG. 6 by following the numerals 7 through 16 that the reinforcing member is next run through slot 52 and adjacent form member 42, around pin C, and back through slot 52 and thereafter out slot 55, adjacent form member 45, around pin F, back into slot 55 and from there into slot 54. The end of the description in FIG. 6 is indicated by the numeral 16. The continuation of the winding pattern from its termination in FIG. 6 is next taken up in FIG. 7 and as will be seen in FIG. 7, the reinforcing member exits slot 54 traveling adjacent the form member 44, around pin E, and back into slot 54, exits through slot 51 and from there travels adjacent form member 41 around pin B, and back into slot 51. The reinforcing member then is moved into slot 50 and thereafter travels adjacent form member 40 around pin A and from this point on the process is repeated until the proper height h is built up as shown in FIG. 2. As mentioned before, the elongated reinforcing member 60 is preferably prewetted with a resinous material which is compatible with the resin from which the impeller is to be finally molded, however, it is possible to wind the elongated reinforcing member 60 and then wet it with the resin after winding.

The next step in the process is to exert a tensioning force upon the vane reinforcing walls 58 which have been produced. This is accomplished by applying a wrench to the cap nut 57 and rotating the hub member 48 from the position which is shown in FIG. 3 (as well as FIGS. 5, 6 and 7), to the position shown in FIG. 1. This causes each of the vane reinforcing walls 58 which are formed by winding the elongated reinforcing member in the manner described, to have tension applied thereto. Prior to curing a forming member 66 (FIG. 2) is pushed into the opening in the hub member 48 to push the reinforcing member into the bottom of the slots 50 through 55 and to shape the cross section as seen in FIG. 8. Forming member 66 is held in the opening by a means which is not shown until after curing. The tensioned reinforcing member is next subjected to a curing of the resin which has been applied thereto, and this is best accomplished by taking the entire assembly and inserting it into an oven until the proper cure has been effected. After the proper cure has been effected, the winding mold is removed from the oven and the vane reinforcing walls 58 are each severed from the pins A, B, C, D, E and F at the outer radial ends of the form members 40 through 45, for example by cutting with a pair of scissors. The cap nut 57 is next removed so as to enable the hub member 48 and attached vane reinforcing walls to be separated from the winding mold and the so-removed hub member is next transported to a final mold which comprises upper and lower mold parts 63 and 64 respectively, best seen in FIG. 8. The final mold need not be described in any particular detail except to say that the contour formed by the upper and lower mold parts is the contour which is to form the outer surface of the finally completed impeller 30. The hub member 48 and the upper mold part 63 have properly mating and oriented wall means so as to angularly locate each of the vane reinforcing walls 58 in an appropriate cavity which is to form the vanes 32 of the final impeller. The resin which the final impeller is to be molded from is placed within the cavity formed by the upper and lower mold parts and the mold parts are brought together.

After the molding operation has been completed the mold parts are kept together until the resin has sufficiently hardened in order to remove the composite resinous mass which forms the finally molded impeller.

In most instances the finally formed impeller is subjected to a post-curing operation after being removed from the mold parts 63 and 64. The preferred materials of construction of the elongated reinforcing member are many and varied, one of the preferred being fiberglass, however, it will be appreciated that nylon, dacron, carbon fibers, and metallic-like wire materials may be also utilized to advantage. If one for example takes a fiberglass construction, it will be appreciated that fiberglass has a very high tensile strength, for example in the range of 500,000 to 750,000 psi. It will be appreciated that in rotation of the impeller, all of the forces are in tension so as to utilize the ultimate strength of the fiberglass material. It will also be appreciated that the resins which are used in the outer molding of the composite impeller construction have an elongation of approximately 5 to 7 percent. On the other hand, the fiberglass fibers have an elongation of about 2 to 3 percent. Consequently, it will be appreciated that the fiber winding should be of a material which has an elongation rate which is less than that of the resinous outer material so that in operation the loading stresses are taken up by the fiber windings.

The resinous materials may be either thermosetting or thermoplastic in nature and suitable examples of thermosetting resins are epoxies, urethanes, phenolics, polyesters and melamines. Suitable examples of thermoplastic resins are polyvinyl chlorides and polyvinylidene flourides. Impeller constructions made in accordance with the teachings of the present invention have endured loadings up to 100,000 g's and 90,000 rpm. It will be appreciated from the construction shown therein that the reinforcing material is kept away from exposure to any fluids with which the impeller may come into contact and the only thing that fluids contact is the outer surface of the resinous material. The molding operation of the present invention produces an impeller which is molded in static and dynamic balance and the impeller has a higher overall efficiency obtained by the molding process since all fluids engage a surface which is extremely smooth.

The resinous formulation which is added to the mold of FIG. 8 may be an epoxy resin which comprises a diglycidyl ether of bisphenol PA and two parts per 100 of a catalyst or hardener of imidazole. Also included in this formulation is 25 parts per 100 of hexahydrophthalic anhydride and 0.5 parts per 100 of stannous octate. Also included in the formulation is 1½ parts of ground carbon to one part of resin and hardener.

Although this invention has been described in its preferred form and preferred practice with a certain degree of particularity, it is understood that the present disclosure of the preferred form and preferred practice has been made only by way of example and that numerous changes in the details of construction and the combination and arrangement of parts and steps may be resorted to without departing from the spirit and the scope of the invention as hereinafter claimed.

What is claimed is:

1. The method of making an impeller having vanes which extend outwardly from a central portion comprising the steps of selecting an elongated reinforcing member and winding the reinforcing member along the path of a vane and to the central portion and along the path of another vane and back to the central portion and along the path of still another vane to build up a reinforcing structure having reinforcing walls for each impeller vane which walls extend in the same direction as the vanes, applying tension to the wound reinforcing member, curing resin on the wound reinforcing member while tension is applied thereto to form a cured reinforcing structure, placing the cured reinforcing structure into a mold having the shape of the finished impeller with the reinforcing walls occupying positions in the mold corresponding to the vanes of the impeller, introducing a curable resin into the mold to assume the shape of and form the finished impeller, curing the resin and removing the formed impeller from the mold.

2. The method as claimed in claim 1 wherein resin is applied to the reinforcing member prior to winding the same.

3. The method as claimed in claim 1, wherein the elongated reinforcing member is a material selected from the group consisting of fiberglass, carbon filaments, metal, nylon filaments and dacron filaments.

4. The method as claimed in claim 1, wherein the resin for the reinforcing member and the impeller mold is selected from the group consisting of thermosetting and thermoplastic resins.

5. The method of making an impeller having vanes which extend outwardly from a central portion comprising the steps of selecting an elongated reinforcing member and arranging the reinforcing member along the path of the vanes to build up a reinforcing structure having reinforcing walls for each impeller vane which members extend in the same direction as the vanes, applying tension to the arranged reinforcing member, curing resin on the arranged reinforcing member while tension is applied thereto to form a cured reinforcing structure, placing the cured reinforcing structure into a mold having the shape of the finished impeller with the reinforcing walls occupying positions in the mold corresponding to the vanes of the impeller, introducing a curable resin into the mold to assume the shape of and form the finished impeller, curing the resin and removing the formed impeller from the mold.

* * * * *